(12) United States Patent
Totadamane Ramappa et al.

(10) Patent No.: US 10,893,564 B2
(45) Date of Patent: Jan. 12, 2021

(54) ABORTING AN EXTENDED SERVICE REQUEST PROCEDURE

(71) Applicant: APPLE INC., Cupertino, CA (US)

(72) Inventors: Shashanka Totadamane Ramappa, Shimoga (IN); Parvez Sheikh, Calcutta (IN)

(73) Assignee: Apple Inc.

( * ) Notice: Subject to any disclaimer, the term of this patent is extended or adjusted under 35 U.S.C. 154(b) by 0 days.

(21) Appl. No.: 15/325,398

(22) PCT Filed: Jul. 20, 2015

(86) PCT No.: PCT/US2015/041179
§ 371 (c)(1),
(2) Date: Jan. 10, 2017

(87) PCT Pub. No.: WO2016/043840
PCT Pub. Date: Mar. 24, 2016

(65) Prior Publication Data
US 2017/0202049 A1 Jul. 13, 2017

(30) Foreign Application Priority Data
Sep. 18, 2014 (IN) ............................ 4554/CHE/2014

(51) Int. Cl.
*H04W 76/19* (2018.01)
*H04W 76/10* (2018.01)
(Continued)

(52) U.S. Cl.
CPC ....... *H04W 76/19* (2018.02); *H04W 36/0022* (2013.01); *H04W 76/10* (2018.02); *H04W 84/042* (2013.01); *H04W 88/06* (2013.01)

(58) Field of Classification Search
CPC . H04W 36/0022; H04W 76/10; H04W 76/19; H04W 84/042; H04W 88/06
See application file for complete search history.

(56) References Cited

U.S. PATENT DOCUMENTS

| 8,340,023 B2 | 12/2012 | Watfa et al. |
| 2012/0157071 A1 | 6/2012 | Pudney et al. |

(Continued)

FOREIGN PATENT DOCUMENTS

| CN | 106797600 A | 5/2017 |
| EP | 2437543 A1 | 4/2012 |

(Continued)

OTHER PUBLICATIONS

International Preliminary Report on Patentability received for International Application No. PCT/US2015/041179, 8 pages.

(Continued)

*Primary Examiner* — Kashif Siddiqui
(74) *Attorney, Agent, or Firm* — Fay Kaplun & Marcin, LLP

(57) ABSTRACT

Briefly, in accordance with one or more embodiments, a method to implement an extended service request procedure for a circuit-switched fallback, comprises communicating with a packet-switched network, and initiating an extended service request procedure for a circuit-switched fallback to handle a voice call. If the voice call is terminated prior to completion of the extended service request procedure, the extended service request procedure may be aborted, and the user may remain in communication with the packet-switched network. Otherwise, the user completes the connection to the circuit-switched network and communicates with a circuit-switched network to handle the voice call.

18 Claims, 5 Drawing Sheets

(51) Int. Cl.
*H04W 36/00* (2009.01)
*H04W 88/06* (2009.01)
*H04W 84/04* (2009.01)

(56) References Cited

U.S. PATENT DOCUMENTS

| | | |
|---|---|---|
| 2012/0231793 A1 | 9/2012 | Wu |
| 2013/0045738 A1 | 2/2013 | Chen |
| 2013/0107811 A1* | 5/2013 | Watfa ............... H04W 4/00 370/328 |
| 2013/0107863 A1* | 5/2013 | Faccin ............. H04W 28/085 370/331 |
| 2013/0195009 A1* | 8/2013 | Ramle ........... H04W 36/0022 370/328 |
| 2013/0235740 A1 | 9/2013 | Kim et al. |
| 2014/0016614 A1* | 1/2014 | Velev ............... H04W 36/14 370/331 |
| 2015/0282012 A1* | 10/2015 | Baek ............. H04W 36/0022 370/331 |
| 2016/0119858 A1* | 4/2016 | Liu ................. H04W 48/16 455/434 |

FOREIGN PATENT DOCUMENTS

| | | |
|---|---|---|
| EP | 3195657 A | 7/2017 |
| JP | 2012514945 A | 6/2012 |
| WO | 2010/080802 A1 | 7/2010 |
| WO | 2010080802 A1 | 7/2010 |
| WO | 2013048219 A2 | 4/2013 |
| WO | 2013151333 A1 | 10/2013 |
| WO | 2016043840 A1 | 3/2016 |

OTHER PUBLICATIONS

Office Action received for Japanese Patent Application No. 2017-513722, dated Jun. 19, 2018, 5 pages including 2 pages of English translation.
Office Action received for Japanese Patent Application No. 2017/513722, dated Feb. 20, 2018, 5 pages including 2 pages of English translation.
Motorola Solutions, "CS Fallback Cancellation," Discussion, Jan. 17-21, 2011, 9 pages. R2-110064, 3GPP TSG-RAN WG2 Meeting #72bis, Dublin, Ireland.
Extended European Search Report received for European Patent Application No. 15842953.0, dated Mar. 1, 2018, 12 pages.
"Handling CSFB Request When VoLTE Call is On-Going in Non SRVCC Capable Network/UE," Change Request, May 19-23, 2014, 6 pages, S2-142001 Version 11.8.0, SA WG2 Meeting #103, Phoenix, AZ.
International Search Report and Written Opinion received for International Application No. PCT/US2015/041179, dated Jul. 20, 2015, 12 pages.
"UTRAN Iu Interface Radio Access Network Application Part (RANAP) Signalling (Release 12)", Jun. 27, 2014, Section 8.5.2, 3GPP TS 25.413 V12.2.0.

* cited by examiner

ABORTING AN EXTENDED SERVICE REQUEST PROCEDURE

CROSS-REFERENCE TO RELATED APPLICATIONS

The present application is the National Stage Application of International Application No. PCT/US2015/041179 filed Jul. 20, 2015, entitled ABORTING AN EXTENDED SERVICE REQUEST PROCEDURE. Said International Application No. PCT/US2015/041179 in turn claims the benefit of Indian Patent Application No. 4554/CHE/2014 filed Sep. 18, 2014. Said International Application No. PCT/US2015/041179 and said Indian Patent Application No. 4554/CHE/2014 are hereby incorporated herein by reference in their entireties for all purposes.

BACKGROUND

Long Term Evolution (LTE) networks are capable of providing higher data speeds to mobile users throughout the globe. In addition, Voice over LTE (VoLTE) allows voice calls to be handled as data via an LTE network. However, deployment of VoLTE features in networks may not be complete such that LTE networks may be available for a user to receive data services, but the operator may still need to provide voice calls/services over legacy networks. In such a situation, a user connected to an LTE network may need to fall back to a legacy second generation (2G) or third generation (3G) network using Global System for Mobile Communications (GSM) or Universal Mobile Telecommunications System (UMTS) Radio Access Technology (RAT) to handle a voice call via a circuit-switched fallback (CSFB) procedure. During a CSFB procedure, the user starts an Extended Service Request with the network to switch from the LTE network to the legacy 2G/3G network. If the user aborts the call during the time during which the Extended Service Request is ongoing, the network will still complete the fallback to the legacy 2G/3G network unnecessarily, and then reselect back to the LTE network. As a result, the user may spend a large of amount of unnecessary time to complete the CSFB procedure even though the voice call may have been already terminated and thereafter suffer from lower data transmission speeds in third and second generation networks functioning in UTMS or GSM, General Packet Radio Service (GPRS) or Enhanced GPRS (EGPRS) RAT technology leading to very bad user experience as the user is paying for LTE high speed data rates.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
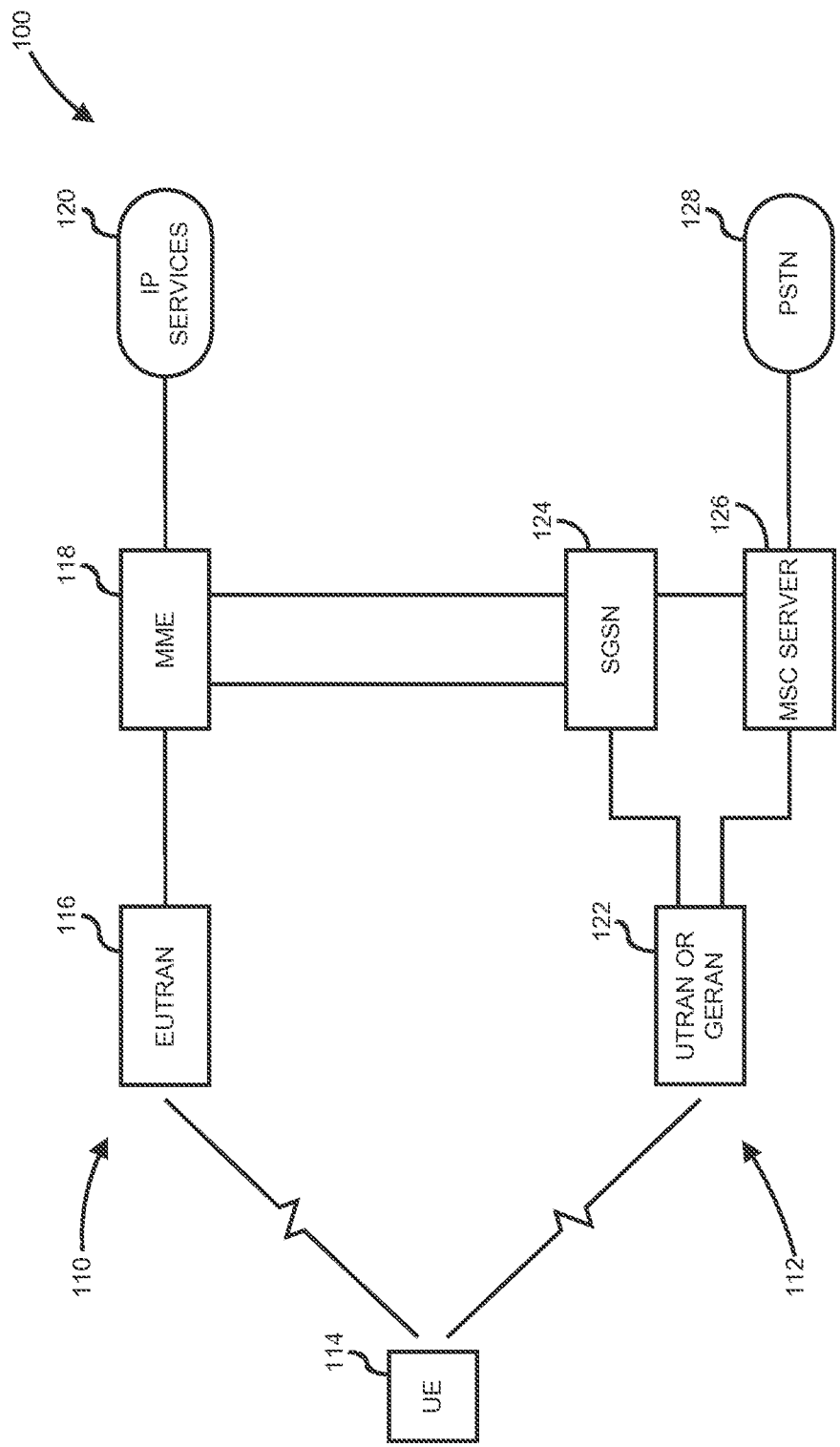
FIG. 1 is a block diagram of a network capable of implementing an extended service request feature in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a network capable of implementing an extended service request feature in accordance with one or more embodiments will be discussed. As shown in FIG. 1, network 100 may comprise a Long Term Evolution (LTE) network 110 and a legacy network 112 which may comprise a Third Generation (3G) network and/or a Second Generation (2G) network. In one or more embodiments, one or more of network 100 and network 112 may be in compliance with a Third Generation Partnership Project (3GPP) standard, and the scope of the claimed subject matter is not limited in this respect. In some embodiments, one or more of network 110 or network 112 may be in compliance with various other standards, for example an Institute of Electrical and Electronics Engineers (IEEE) standard, and/or other variations of a 3GPP standard such as an LTE Advanced (LTE-A) standard, and so on, and the scope of the claimed subject matter is not limited in this respect.

In one or more embodiments, LTE network 110 may comprise a packet-switched network and may include an Evolved Universal Terrestrial Radio Access Network (EU-TRAN) 116 including one or more components of an LTE radio access network, and a Mobility Management Entity (MME) 118 coupled to EUTRAN 116. EUTRAN 116 may include the various components of an LTE radio access network including but not limited to an enhanced Node B (eNB) to provide a wireless link between user equipment (UE) 114 and LTE network 110. Mobility Management Entity (MME) 118 may function as a control node for LTE network 110 and to provide functions such as paging and bearer activation and deactivation for UE 114, among other functions. MME 118 further may further provide control plane functions for mobility of UE 114 between LTE network 110 and legacy network 112. LTE network 110 may include various other functions and/or nodes that are not shown, for example a Serving Gateway, a Packet Date Network (PDN) Gateway, among others, and the scope of the claimed subject matter is not limited in this respect. When connected to LTE network 110, various Internet Protocol (IP) services 120 may be provided to UE 114 via LTE network 120.

In one or more embodiments, legacy network 112 may comprise a circuit-switched network at least in part and may include a Universal Terrestrial Radio Access Network (UTRAN) and/or Global System for Mobile Communications (GSM)/Enhanced Data Rates for GSM Evolution (EDGE) Radio Access Network (GERAN) 122. UTRAN or GERAN 122 comprises a UTRAN when legacy network 112 provides 3G services, and UTRAN or GERAN 122 comprises a GERAN when legacy network 122 provides 2G services. EUTRAN or GERAN 122 includes a radio network access network and respective components to provide a wireless link between UE 114 and legacy network 112 and may include various elements or nodes such as a Node B and a Radio Network Controller (RNC) among various other elements not shown. Legacy network 112 may include a Serving GPRS Support Node (SGSN) 124 to provide data services to UE 114, and a Mobile Switching Center (MSC) Server 126 to provide voice services to UE 114, for example to connect UE 114 to voice calls via Public Switched Telephone Network (PSTN) 128 as circuit-switched calls.

In one or more embodiments, as discussed in further detail below, UE 114 may be coupled with LTE network 110 and may initiate or receive a telephone call. In such a situation, LTE network 110 and/or UE 114 may not support Voice over LTE (VoLTE) services, in which case UE 114 should couple to PSTN 128 to make or receive the telephone call. A circuit-switched fallback (CSFB) procedure may be implemented/supported by network 100 so that the UE 114 may switch from using LTE network 110 to legacy network 112 in order to communicate via PSTN 128 for the duration of the telephone call using voice services. As part of the CSFB procedure, an Extended Service Request for CSFB may be requested by UE 114. In accordance with one or more embodiments, if the call is terminated or otherwise ended before the Extended Service Request procedure is completed, the Extended Service Request procedure may be aborted by UE 114 so that the fallback to legacy network 112 is not completed, and UE 114 remains connected to LTE network 110. An example method to complete or abort the fallback procedure is shown in and described with respect to FIG. 2, below.

Figure 2:
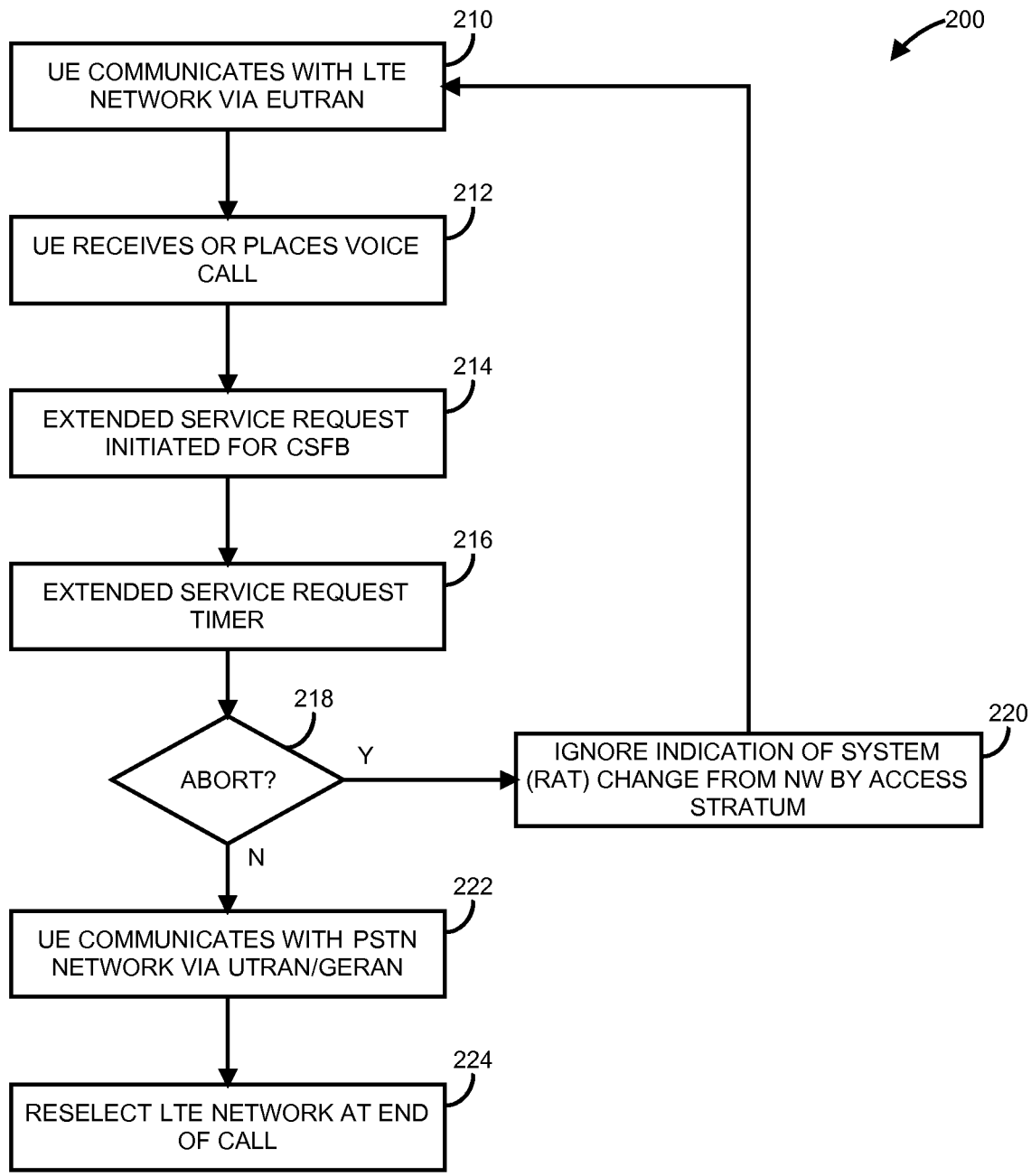
FIG. 2 is a flow diagram of a method implemented by a user equipment to implement an extended service request feature in accordance with one or more embodiments.

Referring now to FIG. 2, a flow diagram of a method implemented by a user equipment to implement an extended service request feature in accordance with one or more embodiments will be discussed. It should be noted that although FIG. 2 illustrates one example embodiments of method 200, method 200 may include more or fewer blocks than shown, and may include various orders of the blocks, and the scope of the claimed subject matter is not limited in these respects. At bock 210, UE 114 communicates via LTE network 110 using EUTRAN 116. UE 114 may receive or place a voice call at block 212 which may be a circuit-switched call. If a circuit-switched fallback (CSFB) procedure is needed to service the voice call, UE 114 may initiate an Extended Service Request at block 214 for implementing the CSFB procedure, and start an Extended Service Request Timer T3417Ext at block 216. A determination may be made at block 218 by UE 114 whether to abort the voice call. For example, the user of UE 114 may terminate the call before the Extended Service Request procedure is completed. In such a situation, UE 114 is aware that the voice call has been aborted or terminated, so that the CSFB procedure may be aborted before UE 114 completes fallback to legacy network 112. UE 114 ignores the Indication of System (Radio Access Technology (RAT)) Change from the Network (NW) at block 220, and UE 114 may remain connected with EUTRAN 116 to continue to communicate via LTE network 110. Thus, UE 114 locally aborts the Extended Service Request procedure and remains coupled with EUTRAN 116 of LTE network 110, and stops the Extended Service Request Timer T3417Ext. Furthermore, UE 114 may not attempt a retry of the Extended Service Request.

In the event UE 114 does not abort the voice call, method 200 may continue to complete the RAT change in which case UE 114 keeps the Extended Service Request Timer T3417Ext running Once the System (Radio Access Technology (RAT)) Change from NW is successful the UE 114 then communicates at block 222 over PSTN 128 via UTRAN or GERAN 122 to handle the voice call as a circuit-switched call. At the end of the voice call, UE 114 may reselect LTE network 110 at block 224. By aborting the Extended Service Request procedure in the event a call is terminated or ended before the procedure is completed, UE 114 may avoid the time involved with reselection to LTE network 110 from legacy network 112 and thereafter also not suffer from lower data transmission speeds in third and second generation networks functioning in UTMS or GSM/(E)GPRS RAT technology leading to very bad user experience as the user is paying for LTE high speed data rates as shown in and described with respect to FIG. 3, below.

Figure 3:
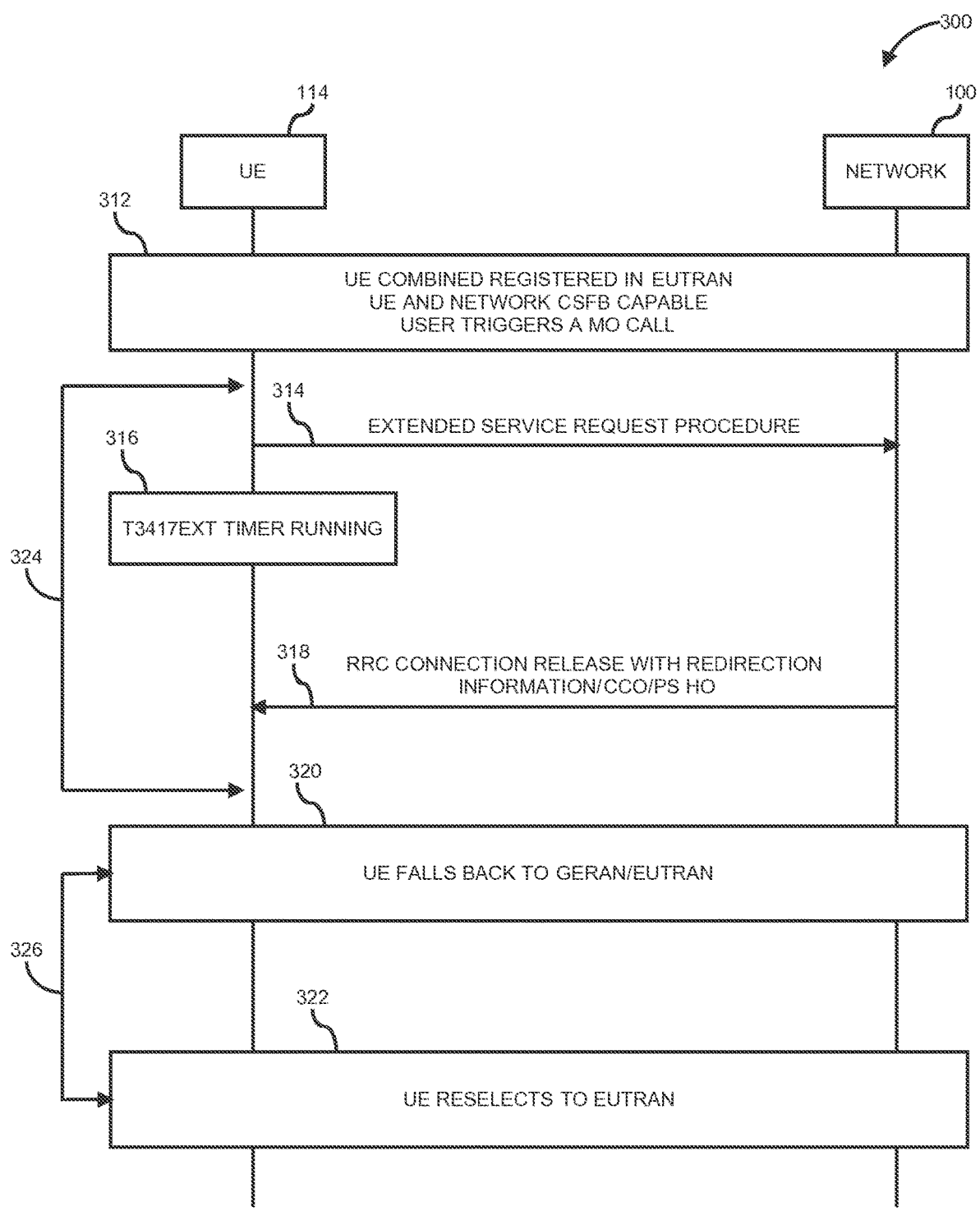
FIG. 3 is a flow diagram of interaction between a user equipment and a network to implement an extended service request in accordance with one or more embodiments.

Referring now to FIG. 3, a flow diagram of interaction between a user equipment and a network to implement an extended service request in accordance with one or more embodiments will be discussed. As shown in FIG. 3, UE 114 communicates with network 100 to implement an extended service request method 300, for example as discussed with respect to FIG. 2 and FIG. 3, above. At step 312, UE 114 is registered with EUTRAN 116, and UE 114 and network 100 are circuit-switched fallback (CSFB) capable, and the user may trigger a mobile originated (MO) call. At step 314, an Extended Service Request Procedure may be communicated from UE 114 to network 110. UE 114 then starts an Extended Service Request Timer T3417Ext running at 316. Network 100 sends a Radio Resource Controller (RCC) connection release with redirection information Cell Change Order (CCO) or a packet-switched (PS) handover (HO) or redirection at step 318. At step 320, UE 114 falls back to the UTRAN or GERAN 122. After the call is complete, UE 114 reselects to EUTRAN 116 at step 322. It should be noted that by implementing method 200 of FIG. 2, UE 114 is capable of aborting method 300 of FIG. 3 at any point during time frame 324. In the event that UE 114 is able to abort method 300 during time frame 324, UE 114 does not need to spend the time involved to fall back to UTRAN or GERAN 122 at step 320 and the time involved to reselect to ETUTRAN 116 at step 322. Thus, UE 114 can avoid time frame 326 during which UE 114 is devoid of LTE services unnecessarily and also not suffer from lower data transmission speeds in third and second generation networks functioning in UTMS or GSM/(E)GPRS RAT technology leading to very bad user experience as the user is paying for LTE high speed data rates.

Figure 4:
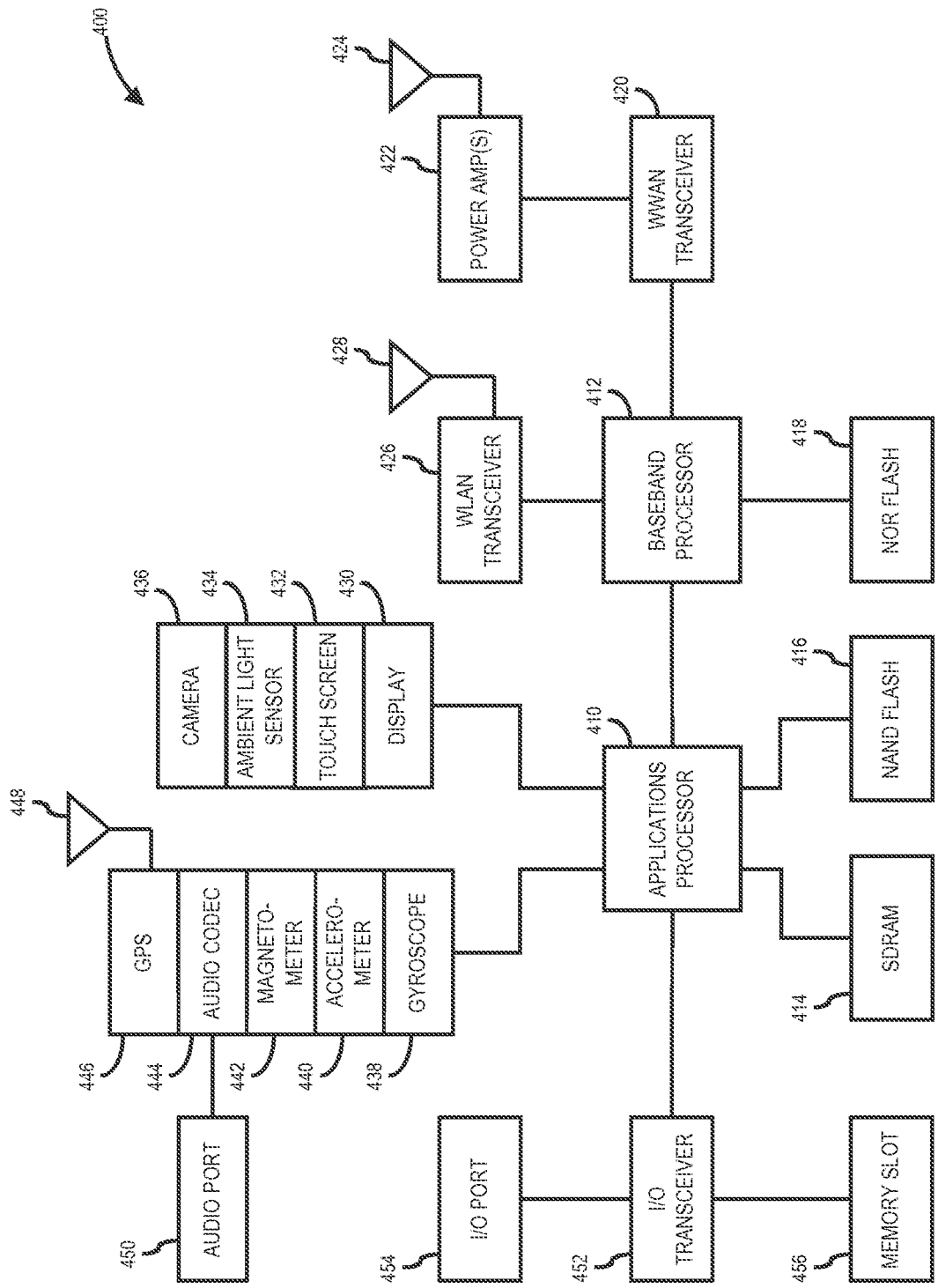
FIG. 4 is a block diagram of an information handling system capable of implementing an extended service request in accordance with one or more embodiments.

Referring now to FIG. 4, a block diagram of an information handling system capable of implementing an extended service request in accordance with one or more embodiments will be discussed. Information handling system 400 of FIG. 4 may tangibly embody any one or more of the elements described herein, above, including for example UE 114, EUTRAN 116, MME 118, UTRAN or GERAN 122, SGSN 124, or MSC Server 126, with greater or fewer components depending on the hardware specifications of the particular device. Although information handling system 400 represents one example of several types of computing platforms, information handling system 400 may include more or fewer elements and/or different arrangements of elements than shown in FIG. 4, and the scope of the claimed subject matter is not limited in these respects.

In one or more embodiments, information handling system 400 may include an application processor 410 and a baseband processor 412. Application processor 410 may be utilized as a general-purpose processor to run applications and the various subsystems for information handling system 400. Application processor 410 may include a single core or alternatively may include multiple processing cores wherein one or more of the cores may comprise a digital signal processor or digital signal processing (DSP) core. Furthermore, application processor 410 may include a graphics processor or coprocessor disposed on the same chip, or alternatively a graphics processor coupled to application processor 410 may comprise a separate, discrete graphics chip. Application processor 410 may include on board memory such as cache memory, and further may be coupled to external memory devices such as synchronous dynamic random access memory (SDRAM) 414 for storing and/or executing applications during operation, and NAND flash 416 for storing applications and/or data even when information handling system 400 is powered off. In one or more embodiments, instructions to operate or configure the information handling system 400 and/or any of its components or subsystems to operate in a manner as described herein may be stored on a article of manufacture comprising a non-transitory storage medium. In one or more embodiments, the storage medium may comprise any of the memory devices shown in and described herein, although the scope of the claimed subject matter is not limited in this respect. Baseband processor 412 may control the broadband radio functions for information handling system 400. Baseband processor 412 may store code for controlling such broadband radio functions in a NOR flash 418. Baseband processor 412 controls a wireless wide area network (WWAN) transceiver 420 which is used for modulating and/or demodulating broadband network signals, for example for communicating via a 3GPP LTE or LTE-Advanced network or the like.

In general, WWAN transceiver 420 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 420 couples to one or more power amps 742 respectively coupled to one or more antennas 424 for sending and receiving radio-frequency signals via the WWAN broadband network. The baseband processor 412 also may control a wireless local area network (WLAN) transceiver 426 coupled to one or more suitable antennas 428 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 410 and baseband processor 412, and the scope of the claimed subject matter is not limited in these respects. For example, any one or more of SDRAM 414, NAND flash 416 and/or NOR flash 418 may comprise other types of memory technology such as magnetic memory, chalcogenide memory, phase change memory, or ovonic memory, and the scope of the claimed subject matter is not limited in this respect.

In one or more embodiments, application processor 410 may drive a display 430 for displaying various information or data, and may further receive touch input from a user via a touch screen 432 for example via a finger or a stylus. An ambient light sensor 434 may be utilized to detect an amount of ambient light in which information handling system 400 is operating, for example to control a brightness or contrast value for display 430 as a function of the intensity of ambient light detected by ambient light sensor 434. One or more cameras 436 may be utilized to capture images that are processed by application processor 410 and/or at least temporarily stored in NAND flash 416. Furthermore, application processor may couple to a gyroscope 438, accelerometer 440, magnetometer 442, audio coder/decoder (CODEC) 444, and/or global positioning system (GPS) controller 446 coupled to an appropriate GPS antenna 448, for detection of various environmental properties including location, movement, and/or orientation of information handling system 400. Alternatively, controller 446 may comprise a Global Navigation Satellite System (GNSS) controller. Audio CODEC 444 may be coupled to one or more audio ports 450 to provide microphone input and speaker outputs either via internal devices and/or via external devices coupled to information handling system via the audio ports 450, for example via a headphone and microphone jack. In addition, application processor 410 may couple to one or more input/output (I/O) transceivers 452 to couple to one or more I/O ports 454 such as a universal serial bus (USB) port, a high-definition multimedia interface (HDMI) port, a serial port, and so on. Furthermore, one or more of the I/O transceivers 452 may couple to one or more memory slots 456 for optional removable memory such as secure digital (SD) card or a subscriber identity module (SIM) card, although the scope of the claimed subject matter is not limited in these respects.

Figure 5:
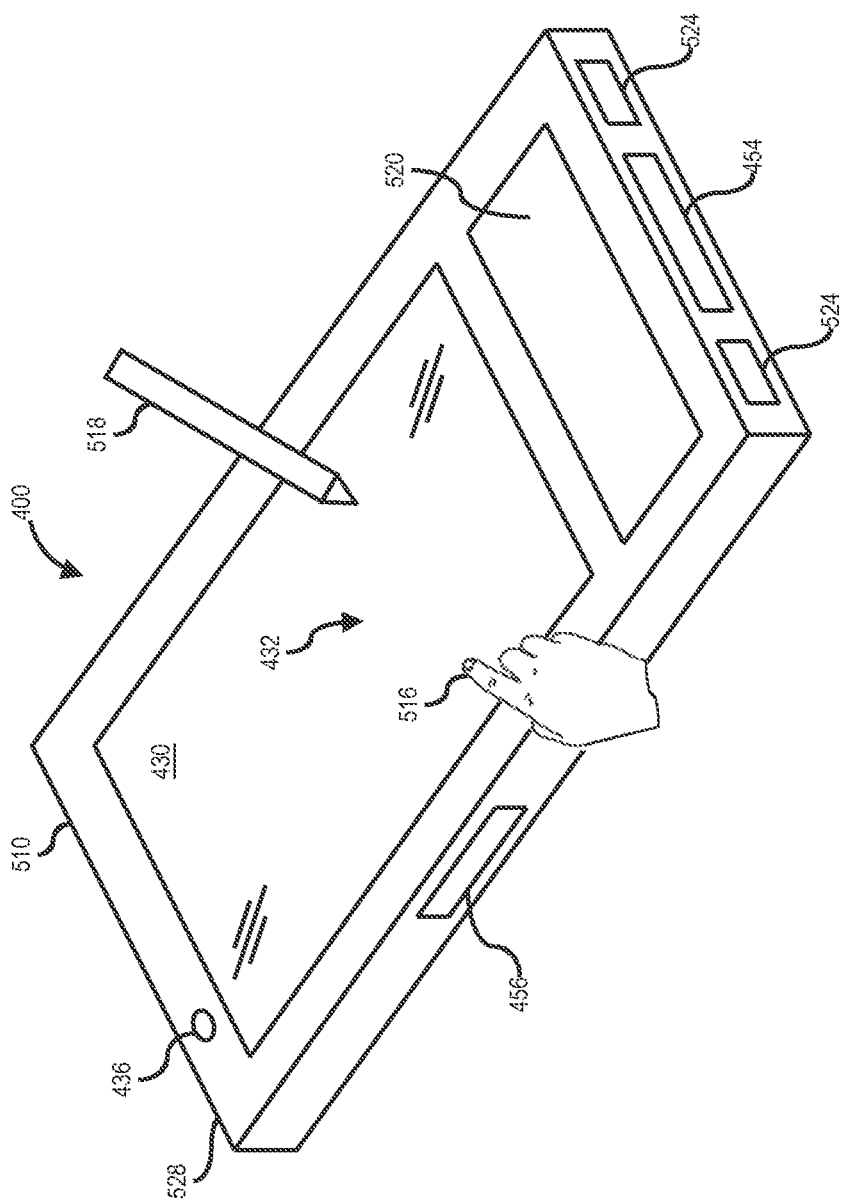
FIG. 5 is an isometric diagram of an information handling system as illustrated in FIG. 4 in accordance with one or more embodiments.

Referring now to FIG. 5, an isometric view of an information handling system of FIG. 4 that optionally may include a touch screen in accordance with one or more embodiments will be discussed. FIG. 5 shows an example implementation of information handling system 400 of FIG. 4 tangibly embodied as a cellular telephone, smartphone, or tablet type device or the like. The information handling system 400 may comprise a housing 510 having a display 430 which may include a touch screen 432 for receiving tactile input control and commands via a finger 516 of a user and/or a via stylus 518 to control one or more application processors 410. The housing 510 may house one or more components of information handling system 400, for example one or more application processors 410, one or more of SDRAM 414, NAND flash 416, NOR flash 418, baseband processor 412, and/or WWAN transceiver 420. The information handling system 400 further may optionally include a physical actuator area 520 which may comprise a keyboard or buttons for controlling information handling system via one or more buttons or switches. The information handling system 400 may also include a memory port or slot 456 for receiving non-volatile memory such as flash memory, for example in the form of a secure digital (SD) card or a subscriber identity module (SIM) card. Optionally, the information handling system 400 may further include one or more speakers and/or microphones 524 and a connection port 454 for connecting the information handling system 400 to another electronic device, dock, display, battery charger, and so on. In addition, information handling system 400 may include a headphone or speaker jack 528 and one or more cameras 436 on one or more sides of the housing 510. It should be noted that the information handling system 400 of FIG. 5 may include more or fewer elements than shown, in various arrangements, and the scope of the claimed subject matter is not limited in this respect.

In or more example embodiments, a user equipment (UE) comprises a radio, a processor coupled to the radio and a memory coupled to the processor, wherein instructions in the memory are capable of configuring the processor to communicate with a packet-switched network, initiate an extended service request procedure for a circuit-switched fallback to handle a voice call, and ignore an indication of Radio Access Technology (RAT) change from network if the voice call is terminated prior to completion of the extended service request procedure. The processor may be configured to remain in communication with the packet-switched network without completing fall back to the circuit-switched network if the voice call is terminated prior to completion of the extended service request procedure. The processor may be configured to reselect the packet-switched network after the voice call is completed. The packet-switched network may comprise a Long Term Evolution (LTE) network, and the packet-switched network may comprises a Second Generation (2G) network or a Third Generation (3G) network. The circuit-switched network may comprise an Evolved Universal Terrestrial Radio Access Network (EUTRAN) and a Mobility Management Entity (MME) to couple to Internet Protocol (IP) Services. The circuit-switched network may comprise a Universal Terrestrial Radio Access Network (UTRAN) and/or Global System for Mobile Communications (GSM)/Enhanced Data Rates for GSM Evolution (EDGE) Radio Access Network (GERAN), a Serving GPRS Support Node (SGSN) and a Mobile Switching Center (MSC) Server to couple to a Public Switched Telephone Network (PSTN) to handle the voice call. The processor may be configured to handle the voice call via the packet-switched network as a Voice over LTE (VoLTE) call, and initiate the extended service request procedure if the packet-switched network no longer supports the VoLTE call.

In one or more example embodiments, a method to implement an extended service request procedure for a circuit-switched fallback comprises communicating with a packet-switched network, and initiating an extended service request procedure for a circuit-switched fallback to handle a voice call. If the voice call is terminated prior to completion of the extended service request procedure, the method further comprises aborting the extended service request procedure and remaining in communication with the packet-switched network, or otherwise, communicating with a circuit-switched network to handle the voice call. The aborting of the extended service request procedure may comprise ignoring an indication of system (Radio Access Technology (RAT)) change from network by access stratum. The method further may comprise reselecting the packet-switched network after the voice call is completed. The packet-switched network may comprise a Long Term Evolution (LTE) network, and the circuit-switched network may comprise a Second Generation (2G) network or a Third Generation (3G) network. The packet-switched network may comprise an Evolved Universal Terrestrial Radio Access Network (EUTRAN) and a Mobility Management Entity (MME) to couple to Internet Protocol (IP) Services. The circuit-switched network may comprise s a Universal Terrestrial Radio Access Network (UTRAN) and/or Global System for Mobile Communications (GSM)/Enhanced Data Rates for GSM Evolution (EDGE) Radio Access Network (GERAN), a Serving GPRS Support Node (SGSN) and a Mobile Switching Center (MSC) Server to couple to a Public Switched Telephone Network (PSTN) to handle the voice call. The voice call may be handled via the packet-switched network as a Voice over LTE (VoLTE) call, and the extended service request procedure may be initiated if the packet-switched network is not able to support the VoLTE call.

In one or more example embodiments, an article of manufacture comprises a non-transitory storage medium having instructions stored thereon that, if executed, result in communicating with a Long Term Evolution (LTE) network, and initiating a circuit-switched fallback procedure to handle a voice call. If the voice call is terminated prior to completion of the circuit-switched fallback procedure, the instructions further result in aborting the circuit-switched fallback procedure and remaining in communication with the LTE network, or otherwise, communicating with a circuit-switched network to handle the voice call. Aborting the extended service request procedure may comprise ignoring an indication of Radio Access Technology (RAT) change from network. The instructions, if executed, further may result in reselecting the LTE network after the voice call is completed. The circuit-switched network may comprise a Second Generation (2G) network or a Third Generation (3G) network. The LTE network may comprise an Evolved Universal Terrestrial Radio Access Network (EUTRAN) and a Mobility Management Entity (MME) to couple to Internet Protocol (IP) Services The circuit-switched network may comprise a Universal Terrestrial Radio Access Network (UTRAN) and/or Global System for Mobile Communications (GSM)/Enhanced Data Rates for GSM Evolution (EDGE) Radio Access Network (GERAN), a Serving GPRS Support Node (SGSN) and a Mobile Switching Center (MSC) Server to couple to a Public Switched Telephone Network (PSTN) to handle the voice call.

Although the claimed subject matter has been described with a certain degree of particularity, it should be recognized that elements thereof may be altered by persons skilled in the art without departing from the spirit and/or scope of claimed subject matter. It is believed that the subject matter pertaining to aborting an extended service request procedure and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A user equipment (UE), comprising:
   a radio; and
   a processor coupled to the radio and a memory coupled to the processor, wherein instructions in the memory configure the processor to:
   communicate with a packet-switched network;
   initiate an extended service request procedure for a circuit-switched fallback to handle a voice call;
   receive an indication of a Radio Access Technology (RAT) change from the packet-switched network during the extended service request procedure;
   determine whether the voice call has been terminated prior to completion of the extended service request procedure; and
   when the voice call has been terminated prior to completion of the extended service request procedure, abort the extended service request procedure, wherein aborting the extended service procedure includes ignoring the indication of the RAT change from the packet-switched network.

2. A user equipment as claimed in claim 1, wherein the processor is further configured to remain in communication with the packet-switched network without completing fall back to the circuit-switched network when the voice call is terminated prior to completion of the extended service request procedure.

3. A user equipment as claimed in claim 1, wherein the processor is further configured to reselect the packet-switched network when the voice call has not been terminated prior to the completion of extended service request procedure and after the voice call is completed.

4. A user equipment as claimed in claim 1, wherein the packet-switched network comprises a Long Term Evolution (LTE) network, and the circuit-switched network comprises a Second Generation (2G) network or a Third Generation (3G) network.

5. A user equipment as claimed in claim 1, wherein the packet-switched network comprises an Evolved Universal Terrestrial Radio Access Network (EUTRAN) and a Mobility Management Entity (MME) to couple to Internet Protocol (IP) Services.

6. A user equipment as claimed in claim 1, wherein the circuit-switched network comprises a Universal Terrestrial Radio Access Network (UTRAN) and/or Global System for Mobile Communications (GSM)/Enhanced Data Rates for GSM Evolution (EDGE) Radio Access Network (GERAN), a Serving GPRS Support Node (SGSN) and a Mobile Switching Center (MSC) Server to couple to a Public Switched Telephone Network (PSTN) to handle the voice call.

7. A user equipment as claimed in claim 1, wherein the processor is configured to handle the voice call via the packet-switched network as a Voice over LTE (VoLTE) call, and initiate the extended service request procedure if the packet-switched network no longer supports the VoLTE call.

8. A method to implement an extended service request procedure for a circuit-switched fallback, comprising:
   communicating with a packet-switched network;
   initiating an extended service request procedure for a circuit-switched fallback to handle a voice call;
   receiving an indication of a Radio Access Technology (RAT) change from the packet-switched network during the extended service request procedure;
   determining whether the voice call has been terminated prior to completion of the extended service request procedure;
   when the voice call has been terminated prior to completion of the extended service request procedure, aborting the extended service request procedure and remaining in communication with the packet-switched network, wherein aborting the extended service request procedure includes ignoring the indication of Radio Access Technology (RAT) change from the packet-switched network; and when the voice call has not been terminated prior to the completion of the extended service request procedure, communicating with a circuit-switched network to handle the voice call.

9. A method as claimed in claim 8, further comprising reselecting the packet-switched network after the voice call is completed.

10. A method as claimed in claim 8, wherein the packet-switched network comprises a Long Term Evolution (LTE) network, and the circuit-switched network comprises a Second Generation (2G) network or a Third Generation (3G) network.

11. A method as claimed in claim 8, wherein the packet-switched network comprises an Evolved Universal Terrestrial Radio Access Network (EUTRAN) and a Mobility Management Entity (MME) to couple to Internet Protocol (IP) Services.

12. A method as claimed in claim 8, wherein the circuit-switched network comprises a Universal Terrestrial Radio Access Network (UTRAN) and/or Global System for Mobile Communications (GSM)/Enhanced Data Rates for GSM Evolution (EDGE) Radio Access Network (GERAN), a Serving GPRS Support Node (SGSN) and a Mobile Switching Center (MSC) Server to couple to a Public Switched Telephone Network (PSTN) to handle the voice call.

13. A method as claimed in claim 8, wherein the voice call is handled via the packet-switched network as a Voice over LIE (VoLTE) call, and the extended service request procedure is initiated if the packet-switched network is no longer able to support the VoLTE call.

14. An article of manufacture comprising a non-transitory storage medium having instructions stored thereon that, if executed, result in:
communicating with a Long Term Evolution (LTE) network;
initiating a circuit-switched fallback procedure to handle a voice call;
receiving an indication of a Radio Access Technology (RAT) change from the LTE network during the circuit-switched fallback procedure;
determining whether the voice call is terminated prior to completion of the circuit-switched fallback procedure;
when the voice call is terminated prior to completion of the circuit-switched fallback procedure, aborting the circuit-switched fallback procedure and remaining in communication with the LTE network, wherein aborting the circuit-switched fallback procedure includes ignoring the indication of Radio Access Technology (RAT) change from the LTE network; and
when the voice call is not terminated prior to completion of the circuit-switched fallback procedure, communicating with a circuit-switched network to handle the voice call.

15. An article of manufacture as claimed in claim 14, wherein the instructions, if executed, further result in reselecting the LTE network after the voice call is completed.

16. An article of manufacture as claimed in claim 14, wherein the circuit-switched network comprises a Second Generation (2G) network or a Third Generation (3G) network.

17. An article of manufacture as claimed in claim 14, wherein the LTE network comprises an Evolved Universal Terrestrial Radio Access Network (EUTRAN) and a Mobility Management Entity (MME) to couple to Internet Protocol (IP) Services.

18. An article of manufacture as claimed in claim 14, wherein the circuit-switched network comprises a Universal Terrestrial Radio Access Network (UTRAN) and/or Global System for Mobile Communications (GSM)/Enhanced Data Rates for GSM Evolution (EDGE) Radio Access Network (GERAN), a Serving GPRS Support Node (SGSN) and a Mobile Switching Center (MSC) Server to couple to a Public Switched Telephone Network (PSTN) to handle the voice call.

* * * * *